UNITED STATES PATENT OFFICE.

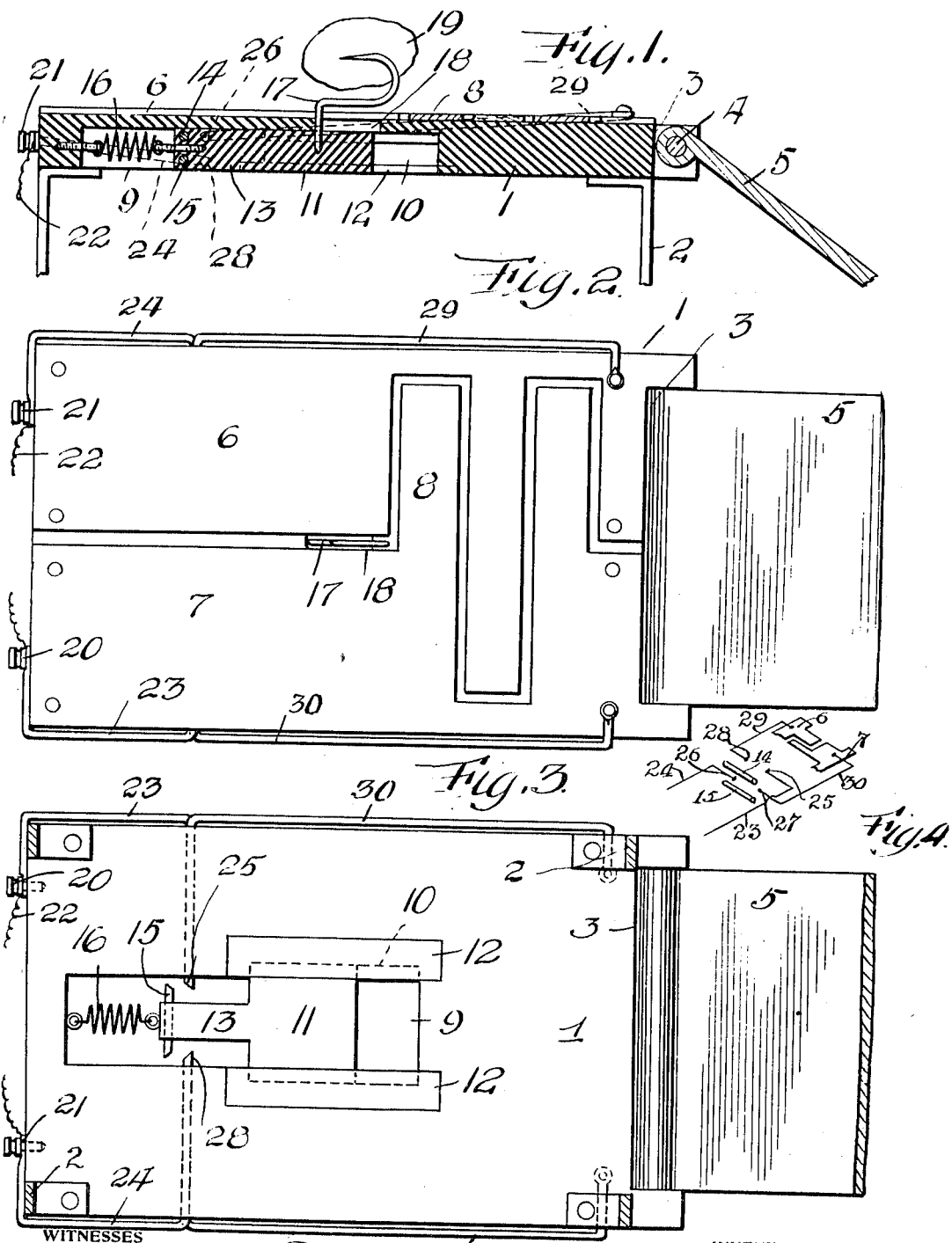

ALBERT ZIAVIN, OF SHELTON, WASHINGTON.

ELECTROCUTING DEVICE FOR RATS.

1,035,672.   Specification of Letters Patent.   Patented Aug. 13, 1912.

Application filed April 6, 1912. Serial No. 688,897.

*To all whom it may concern:*

Be it known that I, ALBERT ZIAVIN, a subject of the Emperor of Austria-Hungary, residing at Shelton, in the county of Mason and State of Washington, have invented certain new and useful Improvements in Electrocuting Devices for Rats, of which the following is a specification, reference being had therein to the accompanying drawing.

This invention relates to an electrocuting device for rats and other rodents, and my invention aims to provide positive, reliable and safe means for utilizing an electric current to exterminate the life of a rodent.

My invention further aims to provide a trap that can be advantageously used in warehouses, department stores, wharves, and rat-infested buildings, the trap being of such construction that it can be easily installed and operated to advantage in exterminating rodents.

My invention still further aims to accomplish the above results by a combination of mechanical elements that will be hereinafter specifically described and then claimed, and reference will now be had to the drawing, wherein—

Figure 1 is a longitudinal sectional view of a portion of the electrocuting device. Fig. 2 is a top plan of the same. Fig. 3 is a bottom plan of the device, and Fig. 4 is a diagrammatical view of a portion of the electrical connections of the device.

An electrocuting device in accordance with this invention comprises a plate or slab 1 of insulating material, and this slab is supported by legs 2 secured to the under side of the slab at the front and rear ends thereof, the front end of a slab has a transverse slot 3 and pivotally mounted in said slot by a pin 4 is a gang plank 5 that facilitates a rodent reaching the top of a slab. Secured to the top of a slab are two metallic plates 6 and 7, the rear ends of said plates being spaced apart, and the forward ends thereof have transverse arms 8 that are staggered with relation to each other, the arms being separated by a gap, but the arrangement of the arms are such that a rodent traversing the device must tread upon the arms of both the plates 6 and 7. The slab 1 has the bottom side thereof provided with a longitudinal recess 9, having the side walls thereof grooved, as at 10, to receive the edges of a block 11, said block being retained within the recess 9 by longitudinal plates 12 mounted in the bottom of the slab. The block 11 has an extension 13 provided with transverse contact pieces 14 and 15. The extension 13 is connected by a coiled retractile spring 16 to the end wall of the recess 9. The block 11 has a bait-holder 17 extending upwardly through a slot 18 provided therefor in the slab, and said bait-holder is provided with a suitable bait 19. The rear end of the slab 1 has binding posts 20 and 21, and to these posts are connected leading-in wires 22, 23, and 24. The wires 22 are in circuit with a suitable source of electrical energy (not shown) of sufficient voltage to electrocute a rodent and by using a suitable step-up device in connection with an ordinary electric light circuit, the voltage can be raised from 110 to 800 or more volts necessary for killing a rodent. The wires 23 and 24 extend into the slab and have terminals 25 and 26 within the recess 9. Associated with these terminals are terminals 27 and 28 of wires 29 and 30 respectively, connected to the metallic tie plates 6 and 7.

A rodent upon the device attempts to pull the bait 19 from the holder 17 and thereby shifts the block 11, causing the contact pieces 14 and 15 to engage the terminals 25, 26, 27, and 28. A circuit is immediately established through the wire 23, terminal 25, contact piece 14 to the terminal 28 of a wire 29, which is connected to the contact plate 6. The circuit passes through the rodent's body approaching the contact plates and continues through the wires 30 and the terminal 27 to the contact piece 15, from said contact piece through the terminal 26 to the wire 24. The rodent's body receives the complete charge and is electrocuted and shocked to that extent that the life of the rodent is exterminated. When the rodent releases the bait-holder, the spring 16 immediately restores the block 11 to position and breaks the electric circuit.

Even though a dead rat should remain upon the device, the circuit is broken and by making the device of sufficient size, there is room enough for other rodents to be electrocuted.

What I claim is:

An electrocuting device for rodents comprising a slab of insulation having the bottom thereof provided with a longitudinal recess, metallic contact plates arranged upon said slab, a spring-held block movably arranged within the recess of said slab, contact pieces carried thereby, a bait-holder carried by said block and extending upwardly through a slot provided therefor in said slab, leading-in wires having terminals in the recess of said slab, and wires connected to said contact plates and having terminals associated with the first mentioned terminals within the recess of said slab and adapted to be engaged by said contact pieces to establish a circuit in connection with said contact plates, through a rodent's body upon said plates.

In testimony whereof I affix my signature in the presence of two witnesses.

ALBERT ZIAVIN.

Witnesses:
J. E. STEWART,
N. A. ODALAICH.